United States Patent
Pieper

(10) Patent No.: US 8,393,549 B2
(45) Date of Patent: Mar. 12, 2013

(54) SYSTEM AND METHOD FOR CONTROLLING TEMPERATURE AND HUMIDITY OF A CONTROLLED SPACE

(75) Inventor: Paul L. Pieper, Dollard-des-Ormeaux (CA)

(73) Assignee: Carrier Corporation, Farmington, CT (US)

( * ) Notice: Subject to any disclaimer, the term of this patent is extended or adjusted under 35 U.S.C. 154(b) by 822 days.

(21) Appl. No.: 12/521,317

(22) PCT Filed: Dec. 29, 2006

(86) PCT No.: PCT/US2006/049705
§ 371 (c)(1),
(2), (4) Date: Jun. 26, 2009

(87) PCT Pub. No.: WO2008/082405
PCT Pub. Date: Jul. 10, 2008

(65) Prior Publication Data
US 2010/0084483 A1    Apr. 8, 2010

(51) Int. Cl.
F24F 3/14    (2006.01)
G05D 22/00    (2006.01)
(52) U.S. Cl. ..................... 236/44 C; 62/176.6
(58) Field of Classification Search ............... 236/44 A, 236/44 C; 62/94, 176.6, 271; 165/8, 66
See application file for complete search history.

(56) References Cited

U.S. PATENT DOCUMENTS

| 4,582,129 A | 4/1986 | Yano et al. |
| 4,719,761 A | 1/1988 | Cromer |
| 4,769,053 A | 9/1988 | Fischer, Jr. |
| 5,179,998 A | 1/1993 | Des Champs |
| 6,141,979 A * | 11/2000 | Dunlap .................. 62/176.6 |
| 6,199,388 B1 | 3/2001 | Fischer, Jr. |
| 7,017,356 B2 | 3/2006 | Moffitt |
| 7,308,798 B2 * | 12/2007 | Caggiano ..................... 62/63 |
| 2005/0050906 A1 * | 3/2005 | Dinnage et al. ................ 62/94 |

FOREIGN PATENT DOCUMENTS

| DE | 4226164 A1 | 2/1994 |
| DE | 9218937 U1 | 6/1996 |
| JP | 2004093013 A | 3/2004 |
| JP | 2004116419 A | 4/2004 |
| WO | 0053979 A1 | 9/2000 |

OTHER PUBLICATIONS

Wringer & Wringer Plus—The Indoor Air Quality Solution, 2007, Des Champs Technologies, Buena Vista, Virginia.
European Search Report for EP Patent Application No. 06850047, dated Jan. 18, 2012.
European Office action for EP Patent Application No. 06850047, dated Oct. 29, 2012.

* cited by examiner

Primary Examiner — Marc Norman
(74) Attorney, Agent, or Firm — Bachman & LaPointe, PC

(57) ABSTRACT

A system for controlling temperature and humidity of a controlled space includes a supply air path for supplying an outside air stream to the controlled space; an exhaust air path for conveying an exhaust air stream from the controlled space; a total energy recovery device in contact with the outside air stream and the exhaust air stream; a dehumidification wheel in contact with two spaced portions of the outside air stream; and a cooler in contact with the outside air stream between the two spaced portions.

20 Claims, 1 Drawing Sheet

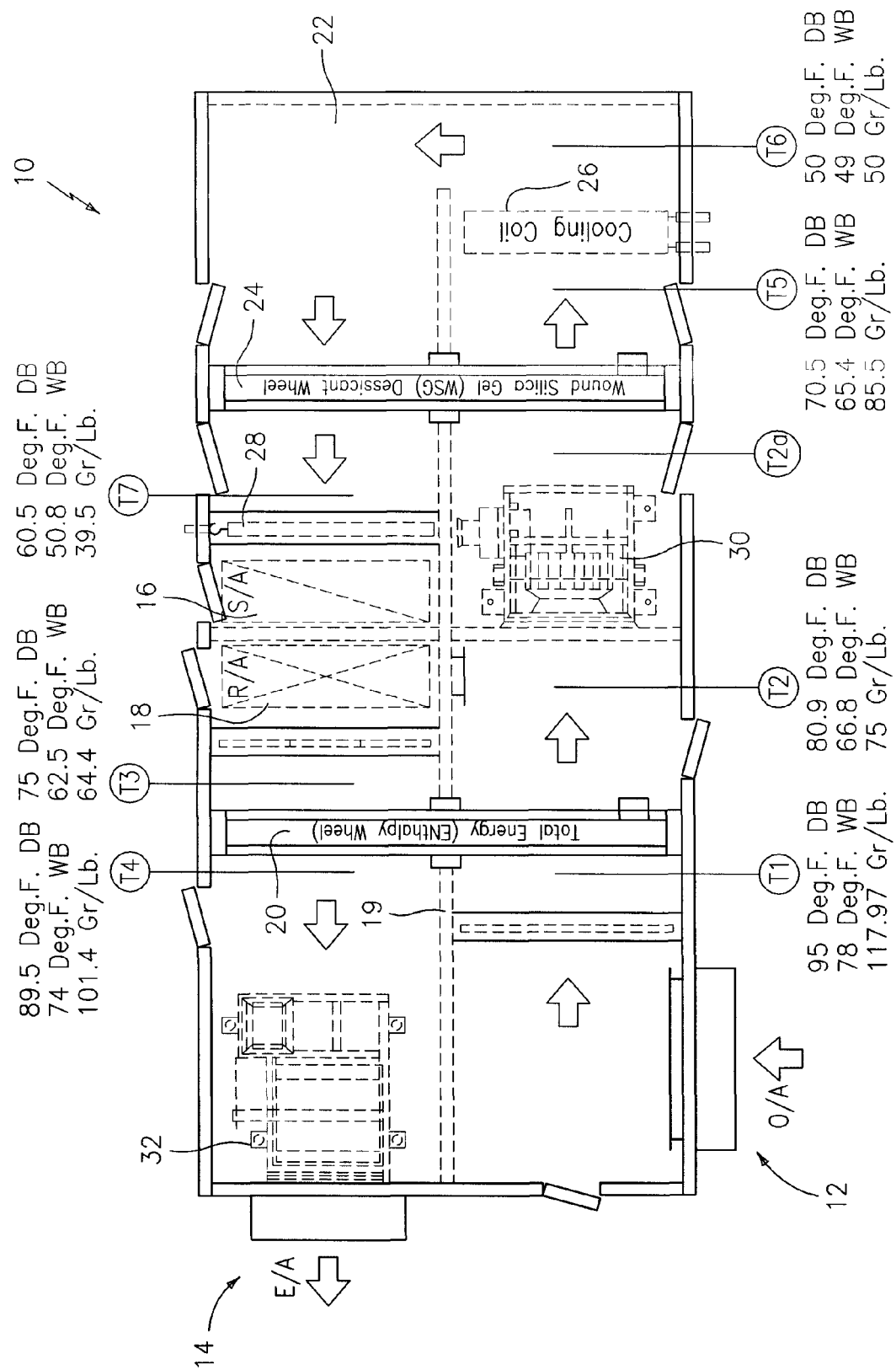

SYSTEM AND METHOD FOR CONTROLLING TEMPERATURE AND HUMIDITY OF A CONTROLLED SPACE

BACKGROUND OF THE INVENTION

The invention relates to the field of heating, ventilation and air conditioning and, more particularly, to a system and method for controlling temperature and humidity of a controlled space.

Uniform standards have been set for minimum treatment of air for conditioning controlled spaces. Two of these standards are ASHRAE/ANSI Standard 90.1 and ASHRAE/ANSI Standard 62, which prescribe basic energy efficiency requirements and minimum amounts of outside air to maintain acceptable indoor air quality. Standard 90.1 requires the use of a total energy recovery device when more than 5000 CFM (and greater than 70%) of outside air is being introduced into a space. Problems arise in hot and humid climates, where introducing large amounts of outdoor air can actually be detrimental to indoor air quality.

Attempts have been made to address this issue. U.S. Pat. No. 6,199,388 is drawn to a system and method for controlling temperature and humidity in a controlled space. However, other attempts at solving this problem still require excessive amounts of mechanical cooling.

The need remains for a system and method for controlling temperature and humidity in a controlled space with reduced requirements for mechanical cooling.

It is therefore the primary object of the present invention to provide such a system and method.

Other objects and advantages of the present invention appear herein.

SUMMARY OF THE INVENTION

According to the invention, the foregoing objects and advantages have been attained.

In accordance with the invention, a system for controlling temperature and humidity of a controlled space is provided, comprising a supply air path for supplying an outside air stream to the controlled space; an exhaust air path for conveying an exhaust air stream from the controlled space; a total energy recovery device in contact with the outside air stream and the exhaust air stream; a dehumidification wheel in contact with two spaced portions of the outside air stream; and a cooler in contact with the outside air stream between the two spaced portions.

In further accordance with the invention, a method is provided

BRIEF DESCRIPTION OF THE DRAWINGS

A detailed description of preferred embodiments of the present invention follows, with reference to the attached drawings, wherein:

FIG. 1 schematically illustrates an embodiment of the invention; and

DETAILED DESCRIPTION

The invention relates to the field of heating, ventilation and air conditioning (HVAC) and more particularly to a system and method for controlling temperature and humidity of a controlled space. The system and method of the invention can utilize 100% outside air, and requires less mechanical cooling than other systems.

FIG. 1 shows a system 10 which includes an outside air inlet 12, an exhaust air outlet 14, a supply air duct 16 for feeding conditioned air to the controlled space (not illustrated), and a return air duct 18 for return air from the controlled space. The system defines a supply air path which conveys outside air from inlet 12 to supply air duct 16, and an exhaust air path which conveys exhaust air from return air duct 18 to outlet 14.

As shown in FIG. 1, the exhaust air path is parallel to a portion of the supply air path, and the paths are separated by a duct wall 19.

A total energy recovery device 20 is positioned to contact air in both the supply air path and the exhaust air path. Device 20 is referred to as a total energy recovery device because it transfers both sensible and latent energy from one side to the other. Thus, device 20 serves to remove sensible and latent energy from air in the supply air path, and transfers this sensible and latent energy to air in the exhaust air path.

Device 20 can preferably be an enthalpy wheel such as is described in U.S. Pat. No. 4,582,129 and/or 4,769,053, for example, but may be any other device that can transfer both sensible and latent energy simultaneously. Such a wheel can be set to rotate at speeds which vary depending upon temperature and humidity adjustment desired for a specific application, and also upon specific characteristics of the wheel. Typically, this device can be rotated at speeds of between about 8 and up to in excess of 30 revolutions per minute.

After passing a portion of the exhaust air path, the supply air path continues to a turn manifold 22 or other type of turn path to double back upon itself as shown in FIG. 1. This defines two parallel portions of the supply air path which are spaced along the path.

A dehumidification wheel 24 can be positioned to contact air in the supply air path at the two spaced locations, and a cooling coil 26 can be positioned along the supply air path between the two contact points of wheel 24 with air in the supply air path.

Dehumidification wheel 24 can suitably be any device which removes latent energy (moisture) from one air stream and passes it to another. This can for example be a desiccant-coated wheel as may be known to a person skilled in the art.

The turn manifold 22 of the supply air path as discussed allows air to be contacted with a first side of wheel 24, then with cooling coil 26, and then with the other side of wheel 24. Thus, wheel 24 in this embodiment rotates through two spaced portions of the supply air path and serves first to cool and humidify the supply air, and then reheat and further dehumidify the cooled air from cooling coil 26.

Also shown in FIG. 1 are typical examples of the condition of air at various points along the supply air and exhaust air paths. Assuming that outside air is obtained at 95° F. DB and 78° F. WB (117.97 grains/lb), this air can be treated at one side of device 20 to temper the outside air and produce air at 80.9° F. DB and 66.8° F. WB (75 grains/lb). This tempered stream of air then reaches the first side of wheel 24, and this wheel serves to cool the tempered air to produce cooled air at 70.5° F. DB and 65.4° F. WB (85.5 grains/lb). This cooled air then flows past cooling coil 26 and is mechanically cooled to produce sub-cooled air at 50° F. DB and 49° F. WB (50 grains/lb).

Sub-cooled air from cooling coil 26 then passes the other side of wheel 24 and is reheated to 60.5° F. DB and 50.8° F. WN (39.5 grains/lb). This reheated stream of air can then be fed to the controlled space as supply air, and/or can be fed to a re-heat coil 28 which can be positioned along the supply air path between the second side of wheel 24 and the supply air outlet 16.

Air is also removed from the controlled space, and this air is referred to as return air. Return air is drawn from the controlled space through return air duct 18, for example at 75° F. DB and 62.5° F. WB (64.4 grains/lb). Passing the other side of device 20 increases the temperature and humidity of exhaust air passing thereby to produce exhaust air at 89° F. DB and 74° F. WB (101.4 grains/lb).

FIG. 1 shows a fan 30 which drives air along the supply air path. Fan 30 is shown in a particularly suitable location, but can alternatively be positioned at any location which serves to keep the air flowing at a desired speed, preferably without significantly contributing to heat and/or moisture already present in the air stream.

A further air handler 32, in this illustration an exhaust fan, can also be positioned along the exhaust path for driving air along the exhaust path if desired.

A system as illustrated in FIG. 1 can produce a supply air temperature of 60.5° F. DB/50.8° F. WB at 5000 CFM with less than 20 tons of mechanical cooling capacity. Under like circumstances, a conventional air conditioning system could require 50 tons of mechanical cooling capacity, and a standard dual wheel system could require 30 tons of mechanical cooling capacity. Further, the system of the present invention will produce extremely low dew point supply air even under part load conditions.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

The invention claimed is:

1. A system for controlling temperature and humidity of a controlled space, comprising:
    a supply air path for supplying an outside air stream to the controlled space;
    an exhaust air path for conveying an exhaust air stream from the controlled space;
    a total energy recovery device in contact with the outside air stream and the exhaust air stream;
    a dehumidification wheel in contact with two spaced portions of the outside air stream; and
    a cooler in contact with the outside air stream between the two spaced portions, wherein the supply air path sequentially passes the total energy recovery device, the dehumidification wheel, the cooler, and then the dehumidification wheel again before reaching the controlled space.

2. The system of claim 1, wherein the supply air path further comprises a turn manifold for conveying the outside air stream from one side of the dehumidification wheel past the cooler and to the other side of the dehumidification wheel.

3. The system of claim 1, wherein the total energy recovery device comprises an enthalpy wheel positioned to rotate through the outside air stream and the exhaust air stream.

4. The system of claim 1, wherein the dehumidification wheel comprises a desiccant dehumidification wheel.

5. The system of claim 1, wherein the cooler comprises a cooling coil positioned along the outside air stream.

6. The system of claim 1, further comprising a reheat coil downstream of the dehumidification wheel.

7. The system of claim 6, wherein the dehumidification wheel rotates through the two spaced portions, and wherein the reheat coil is downstream of both spaced portions.

8. The system of claim 1, wherein the exhaust air path and a portion of the supply air path are substantially co-linear.

9. A method for operating the system of claim 1, comprising:
    driving the outside air stream along the supply air path;
    using the total energy recovery device to transfer energy from the outside air stream to the exhaust air stream;
    using the dehumidification wheel to further cool the outside air stream at a first of said two spaced portions;
    further cooling the outside air stream with said cooler;
    reheating the outside air stream at the second of the said spaced portions; and
    adding energy to the exhaust air stream via the total energy recovery device.

10. The system of claim 1 wherein:
    the means for dehumidifying comprises a wound silica gel desiccant wheel.

11. The system of claim 1 wherein:
    the total energy recovery device comprises an enthalpy wheel.

12. A system for controlling temperature and humidity of a controlled space, comprising:
    a supply air path for supplying an outside air stream to the controlled space;
    an exhaust air path for conveying an exhaust air stream from the controlled space;
    means for recovering energy in contact with the outside air stream and exhaust air stream;
    means for dehumidifying in contact with two spaced portions of the outside air stream; and
    means for cooling in contact with the outside air stream between the two spaced portions, wherein the supply air path extends from an outside air inlet sequentially through the means for recovering, the means for dehumidifying, the means for cooling, and the means for dehumidifying again before reaching the controlled space.

13. The system of claim 12 wherein the means for recovering energy comprises an enthalpy wheel positioned to rotate through the outside air stream and the exhaust air stream.

14. The system of claim 13 wherein the means for dehumidifying comprises a desiccant dehumidification wheel.

15. The system of claim 14 wherein the means for cooling comprises a cooling coil.

16. The system of claim 15 further comprising:
    means for reheating downstream of the means for dehumidifying.

17. The system of claim 12 wherein:
    a leg of the supply air path through the means for dehumidifying downstream of the means for cooling is substantially co-linear with a leg of the exhaust air path through the means for recovering energy.

18. The system of claim 12 wherein:
    the means for dehumidifying comprises a wound silica gel desiccant wheel.

19. A system for controlling temperature and humidity of a controlled space, comprising:
    a supply air path for supplying an outside air stream to the controlled space;
    an exhaust air path for conveying an exhaust air stream from the controlled space;
    a total energy recovery device in contact with the outside air stream and the exhaust air stream;
    a dehumidification wheel in contact with two spaced portions of the outside air stream;
    a reheat coil downstream of the dehumidification wheel, wherein the dehumidification wheel rotates through the two spaced portions, and wherein the reheat coil is downstream of both spaced portions; and a cooler in contact with the outside air stream between the two spaced portions.

20. The system of claim 19 wherein the supply air path further comprises a turn manifold for conveying the outside air stream from one side of the dehumidification wheel past the cooler and to the other side of the dehumidification wheel.

* * * * *